United States Patent
Li et al.

(10) Patent No.: US 11,038,852 B2
(45) Date of Patent: Jun. 15, 2021

(54) METHOD AND SYSTEM FOR PREVENTING DATA LEAKAGE FROM TRUSTED NETWORK TO UNTRUSTED NETWORK

(71) Applicant: Alibaba Group Holding Limited, Grand Cayman (KY)

(72) Inventors: Xiaoning Li, Bellevue, WA (US); Li Shen, Bellevue, WA (US); Yanhui Zhao, Bellevue, WA (US)

(73) Assignee: Alibaba Group Holding Limited, George Town (KY)

( * ) Notice: Subject to any disclaimer, the term of this patent is extended or adjusted under 35 U.S.C. 154(b) by 310 days.

(21) Appl. No.: 16/271,379

(22) Filed: Feb. 8, 2019

(65) Prior Publication Data

US 2020/0259799 A1 Aug. 13, 2020

(51) Int. Cl.
*H04L 29/06* (2006.01)
*H04L 9/32* (2006.01)

(52) U.S. Cl.
CPC .......... *H04L 63/045* (2013.01); *H04L 9/3234* (2013.01); *H04L 63/20* (2013.01); *H04L 2209/127* (2013.01)

(58) Field of Classification Search
CPC ..... H04L 63/045; H04L 9/3234; H04L 63/20; H04L 2209/127; H04L 63/06;
(Continued)

(56) References Cited

U.S. PATENT DOCUMENTS

| 8,041,335 B2 | 10/2011 | Khetawat |
| 8,266,433 B1 | 9/2012 | Przykucki |
| (Continued) | | |

FOREIGN PATENT DOCUMENTS

| CN | 101222488 | 7/2008 |
| CN | 101741852 | 6/2010 |
| (Continued) | | |

OTHER PUBLICATIONS

Baker et al. "Recommendation for Key Management—Part 1: General (Revision 3)", NIST Special Publication 800-57, Jul. 2012 (Year:2012).

(Continued)

*Primary Examiner* — Huan V Doan
(74) *Attorney, Agent, or Firm* — Shun Yao; Park, Vaughan, Fleming & Dowler LLP

(57) ABSTRACT

One embodiment provides a system for establishing a secure network. During operation, a server can distribute at least one symmetric encryption key among a plurality of hosts to enable the hosts to communicate securely with each other. Each host comprises at least a smart network interface card and a central processing unit (CPU) of each host computer supports remote attestation. Distributing the symmetric encryption key among the hosts can include performing a remote attestation operation to establish a trusted channel between the server and a protected region within the CPU of a respective host; and transmitting, over the trusted channel, the symmetric encryption key to the CPU of the respective host, which in turn forwards the symmetric encryption key to the smart network interface card of the respective host over a secure channel established between the protected region within the CPU and the smart network interface card.

20 Claims, 10 Drawing Sheets

(58) Field of Classification Search
CPC ... H04L 63/0435; H04L 9/083; H04L 9/0897; H04L 9/3247
See application file for complete search history.

(56) References Cited

U.S. PATENT DOCUMENTS

| | | |
|---|---|---|
| 8,990,550 B1 | 3/2015 | Hushon |
| 9,698,979 B2 | 7/2017 | Armstrong |
| 9,830,467 B1 | 11/2017 | Harold |
| 2001/0023416 A1 | 9/2001 | Hosokawa |
| 2005/0071632 A1 | 3/2005 | Pauker |
| 2008/0065881 A1 | 3/2008 | Dawson |
| 2009/0019285 A1 | 1/2009 | Chen |
| 2009/0125444 A1 | 5/2009 | Cochran |
| 2009/0147958 A1* | 6/2009 | Calcaterra ............ H04L 9/0833 380/260 |
| 2009/0262942 A1 | 10/2009 | Maeda |
| 2010/0132015 A1 | 5/2010 | Lee |
| 2010/0277435 A1 | 11/2010 | Han |
| 2010/0299526 A1 | 11/2010 | Wiseman |
| 2011/0167503 A1 | 7/2011 | Horal |
| 2012/0084570 A1 | 4/2012 | Kuzin |
| 2012/0087500 A1 | 4/2012 | Ukita |
| 2013/0142336 A1* | 6/2013 | Fries .................... H04L 9/0833 380/278 |
| 2013/0159704 A1 | 6/2013 | Chandrasekaran |
| 2013/0219454 A1 | 8/2013 | Hewinson |
| 2013/0259233 A1 | 10/2013 | Baba |
| 2013/0262873 A1 | 10/2013 | Read |
| 2013/0267204 A1 | 10/2013 | Schultz |
| 2013/0308506 A1 | 11/2013 | Kim |
| 2014/0104137 A1 | 4/2014 | Brown |
| 2014/0173713 A1 | 6/2014 | Zheng |
| 2015/0062904 A1 | 3/2015 | Sanga |
| 2015/0089624 A1 | 3/2015 | Kim |
| 2015/0134727 A1 | 5/2015 | Lee |
| 2015/0134947 A1 | 5/2015 | Varcoe |
| 2015/0207926 A1 | 7/2015 | Brown |
| 2015/0270963 A1 | 9/2015 | Tanizawa |
| 2015/0271147 A1 | 9/2015 | Tanizawa |
| 2015/0309924 A1 | 10/2015 | Chen |
| 2016/0013937 A1 | 1/2016 | Choi |
| 2016/0087946 A1 | 3/2016 | Yang |
| 2016/0127127 A1 | 5/2016 | Zhao |
| 2016/0149700 A1 | 5/2016 | Fu |
| 2016/0366713 A1 | 12/2016 | Sonnino |
| 2017/0104588 A1 | 4/2017 | Camenisch |
| 2018/0063709 A1 | 3/2018 | Morrison |
| 2018/0077449 A1 | 3/2018 | Herz |
| 2018/0262907 A1 | 9/2018 | Alanis |
| 2018/0351734 A1 | 12/2018 | Zhao |

FOREIGN PATENT DOCUMENTS

| | | |
|---|---|---|
| CN | 102946313 | 2/2013 |
| CN | 104486307 | 4/2015 |
| CN | 104579694 | 4/2015 |
| CN | 104780040 | 7/2015 |
| EP | 3007478 | 4/2016 |

OTHER PUBLICATIONS

Sufyan T. Faraj, "A Novel Extension of SSL/TLS Based on Quantum Key Distribution", Computer and Communication Engineering, 2008. ICCCE 2008. International Conference on, IEEE, Piscataway, NJ, USA, May 16, 2008, pp. 919-922.

* cited by examiner

METHOD AND SYSTEM FOR PREVENTING DATA LEAKAGE FROM TRUSTED NETWORK TO UNTRUSTED NETWORK

BACKGROUND

Field

This disclosure is generally related to data security. More specifically, this disclosure is related to a system and method for facilitating a trusted network in a cloud computing environment.

Related Art

In recent years, cloud computing has become a highly demanded service or utility due to the advantages of high computing power, cheap cost of services, high performance, scalability, and accessibility, as well as availability. In cloud computing, different services, including servers, storage, and applications, can be delivered by the service provider to a customer's computers and devices via the Internet. The cloud service providers are responsible for protecting and maintaining the physical environment (e.g., data centers). Cloud computing can be a cost-saving solution for enterprise users because they no longer need to purchase hardware, and can only pay for the services that is actually used. Could computing customers can have immediate access to a broad range of resources and applications hosted in the infrastructure of other organizations, allowing data collaborations among users in different physical domains. However, security is a big concern for cloud computing users. Conventional data security approaches cannot meet the unique security requirements of cloud computing.

SUMMARY

One embodiment described herein provides a system and method for establishing a secure network that includes a plurality of host computers. During operation, a server computer can distribute at least one symmetric encryption key among the plurality of host computers to enable the plurality of host computers to communicate securely with each other using the distributed symmetric encryption key. Each host computer can include at least a smart network interface card, and a central processing unit (CPU) of each host computer supports remote attestation. Distributing the symmetric encryption key among the plurality of host computers can include performing a remote attestation operation to establish a trusted channel between the server computer and a protected region within the CPU of a respective host computer; and transmitting, over the trusted channel, the symmetric encryption key to the CPU of the respective host computer, which in turn forwards the symmetric encryption key to the smart network interface card of the respective host computer over a secure channel established between the protected region within the CPU and the smart network interface card.

In a variation on this embodiment, the smart network interface card of the respective host computer is configured to encrypt a packet to be sent to a second host computer using the symmetric encryption key before transmitting the packet to the second host computer.

In a further variation, a corresponding smart network interface card of the second host computer is configured to decrypt the encrypted packet.

In a variation on this embodiment, the CPU of each host computer implements at least in part an embedded trusted execution environment (TEE) technology, which can include Intel® Software Guard Extension (SGX) technology, Arm® TrustZone technology, AMD® Secure Technology, and other TEE technologies.

In a variation on this embodiment, the server computer is configured to distribute a set of symmetric encryption keys, with each individual symmetric encryption key being used for secure communications between a particular pair of host computers selected from the plurality of host computers.

In a further variation, the server computer is further configured to distribute, among the plurality of host computers, a key-host mapping table.

In a variation on this embodiment, the smart network interface card can include a processor embedded with a trusted firmware module, and the trusted firmware module facilitates establishing the secure communication channel between the protected region within the CPU and the smart network interface card.

In a further variation, establishing the secure communication channel between the protected region within the CPU and the smart network interface card involves a public/private key pair associated with the trusted firmware module.

In a variation on this embodiment, the plurality of host computers forms a network group, and a global server computer can be configured to distribute at least one inter-group encryption key among a plurality of network groups to enable the plurality of network groups to communicate securely with each other using the inter-group encryption key.

In a further variation, a respective network group can include a gateway host computer, and a smart network interface card associated with the gateway host computer can include an inter-group port for transmitting and receiving inter-group packets. The global server computer can be configured to send the inter-group encryption key to the smart network interface card associated with the gateway host computer.

DETAILED DESCRIPTION

Figure 1:
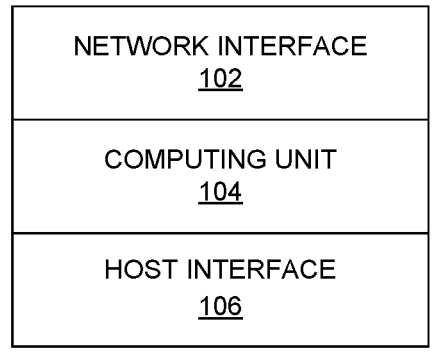
FIG. 1 presents a diagram illustrating the architecture of an exemplary smart network interface card (SmartNIC), according to one embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

In this disclosure, a method and system are presented for facilitating a trusted network in a cloud computing setting. More specifically, each host in the trusted network is equipped with a smart network interface card (SmartNIC), which has a built-in processor. The SmartNIC can be configured to perform encryption/decryption operations on all outgoing and incoming packets using a secret key shared among the hosts within the trusted network. To ensure the secrecy of the shared key in order to prevent information leakage, a hardware-based attestation scheme can be used. More specifically, the central processing unit (CPU) of each host can implement the Intel® Software Guard Extension (SGX) technology that can protect sensitive information.

Trusted Execution Environment

Trusted Computing is an emerging technology developed by the Trusted Computing Group (TCG) with a view toward building trustworthy computer platforms. In trusted computing, the computer will consistently behave in expected ways, and those behaviors will be enforced by computer hardware and software. Enforcing this behavior is achieved by loading the hardware with a unique encryption key inaccessible to the rest of the system. According to the TCG, "trusted component, operation, or process is one whose behavior is predictable under almost any operating condition and which is highly resistant to subversion by application software, viruses, and a given level of physical interference."

Trust technologies have predominantly evolved across diverse computing environments, like smart cards, virtualized platforms, and mobile devices. Moreover, recent development in trusted computing technologies includes the development of a trusted execution environment (TEE), which refers to a secure area inside a main processor (e.g., the central processor unit (CPU)). The TEE runs in parallel with the operating system, in an isolated environment, and can guarantee that the code and data loaded in the TEE are protected with respect to confidentiality and integrity. TEE is more secure than the classic system (called REE, or rich execution environment) in that it uses both hardware and software to protect data and code.

Trusted applications running in a TEE have access to the full power of a device's main processor and memory, whereas hardware isolation protects these components from user-installed applications running in the main operating system. Software and cryptographic isolations inside the TEE can protect the different contained trusted applications from each other.

A range of implementations of the TEE have been developed with diverse characteristics. Hardware trusted execution environments have been designed in different ways by different vendors. In a cloud computing environment, the performance is very important and affects end user experience. TEE solutions based on a trusted platform module (TPM) often have low speed and cannot meet the requirements of cloud computing. Although a hardware security module (HSM) can be a better solution, it has to be deployed in the cloud environment beforehand. On the other hand, Intel® SGX technology makes hardware the root of trust built inside a CPU directly without any extra device. Intel SGX can provide secure computing capabilities for both personal computers and cloud computing. More specifically, Intel SGX protects an application's secrets from malicious software by creating isolated memory regions of code and data called enclaves. These non-addressable memory pages are reserved from the system's physical RAM and then encrypted, allowing the application to access its secrets without fear of exposure. With Intel SGX, secrets remain secret even if the application, operating system, BIOS, or VMM are compromised. Intel SGX applications can be built to include a trusted part and an untrusted part. When an application needs to work with a secret, it creates an enclave that is placed in trusted memory. It then calls a trusted function to enter the enclave, where it is given a view of its secrets in clear text.

With SGX, only the data and code deemed security-critical is relocated to the enclave by defining 'trusted' functions in SGX specification language controlled by the developer, while the enclave application itself is written in a subset of C/C++. Enclaves may read/write to memory spaces in the host application, but not from the host application to enclaves outside of these pre-defined functions; enclaves are also unable to access other enclaves' contents arbitrarily.

One important function provided by SGX is its remote attestation mechanism. This mechanism is based on the Enhanced Privacy ID (EPID) protocol—a Direct Anonymous Attestation (DAA) protocol that uses a group signature scheme in conjunction with a CPU-bound EPID key. A separate, special enclave (the quoting enclave) is used to measure, sign and certify the state of the enclave application, along with collecting other platform-specific data, which is transmitted back to the attestation challenger. Local attestation is also available for enabling two enclaves to verify the operating state of each other running on the same physical CPU. In this process, the enclaves produce separate operating reports containing their identities. Next, MACs (message authentication codes) are computed over these reports using 128-bit AES-CMACs (cipher-based message authentication codes) under a common report key bound to the underlying CPU. The MACs and common report key are used to verify whether the enclaves are executing on the same platform. In some embodiments, SGX's remote attestation mechanism can allow provisioning of sensitive data (e.g., encryption keys).

Smart Network Interface Card (NIC)

A smart or programmable network interface card (SmartNIC) refers to a NIC (e.g., a network adapter) that includes an on-board processor and is capable of offloading processing tasks that the system CPU would normally handle. Using its on-board processor, the SmartNIC can perform any combination of encryption/decryption, firewall, TCP/IP and HTTP processing.

There are different implementations of SmartNICs, such as application-specific integrated circuit (ASIC)-, field-programmable gate array (FPGA)-, and system-on-chip (SOC)-based implementations. An ASIC NIC is very cost-effective and may deliver the best price performance, but it suffers from limited flexibility. An FPGA NIC by contrast is highly programmable and, with enough time and effort, can be made to support almost any functionality relatively efficiently (within the constraints of the available gates). However, FPGAs are notoriously difficult to program and expensive. On the other hand, SOC can provide what appears to be the best SmartNIC implementation option: good price performance, easy to program, and highly flexible. In some embodiments of the present invention, each host in the secure network can include an SOC-based SmartNIC, such as a Mellanox® BlueField™ SmartNIC. The Mellanox BlueField SmartNIC is a two-port 25 Gb/s network adapter featuring the BlueField system-on-chip (SOC), which integrates the ConnectX®-5 network controller with Arm® core processors, to deliver an innovative and high-performance programmable platform. The BlueField adapter enables a more efficient use of computing resources and reduces total cost of ownership (TCO) by offloading security, networking and storage functions such that the server CPU can focus on computing and applications.

FIG. 1 presents a diagram illustrating the architecture of an exemplary SmartNIC, according to one embodiment. SmartNIC 100 can include a network interface 102, a computing unit 104, and a host interface 106.

Network interface 102 can facilitate connectivity to a network, e.g., an Ethernet network, and can be responsible for sending and receiving network packets. In some embodiments, interface 102 can be similar to a conventional network interface card (NIC) and can include at least two network ports. One network port can be used for communication with other in-group hosts or service providers within a secure network group, whereas the other port can be used in a gateway unit for communication with hosts in other network groups or a global service provider (SP) server.

Computing unit 104 can include one or more processors, a memory (e.g., DRAM (dynamic random-access memory), and a storage unit (e.g., an eMMC (embedded MultiMedia-Card) storage unit or an SSD (solid state drive) storage unit). In some embodiments, computing unit 104 can include an array of multicore processors, such as Arm® multicore processors. Computing unit 104 enables more efficient use of computing resources and reduces TCO by offloading security, networking, and storage functions such that the host CPU can focus on computing and applications. In some embodiments, computing unit 104 can include embedded Arm trusted firmware (ATF) that can facilitate establishing trust between SmartNIC 100 and a remote attestation server.

Host interface 106 facilitates the interface between Smart-NIC and the host computer. In some embodiments, host interface 106 can be a high speed (e.g., 25 GBE or 100 GBE) peripheral component interconnect express (PCIe) interface that can connect SmartNIC 100 to the bus.

Secure Network

Figure 2:
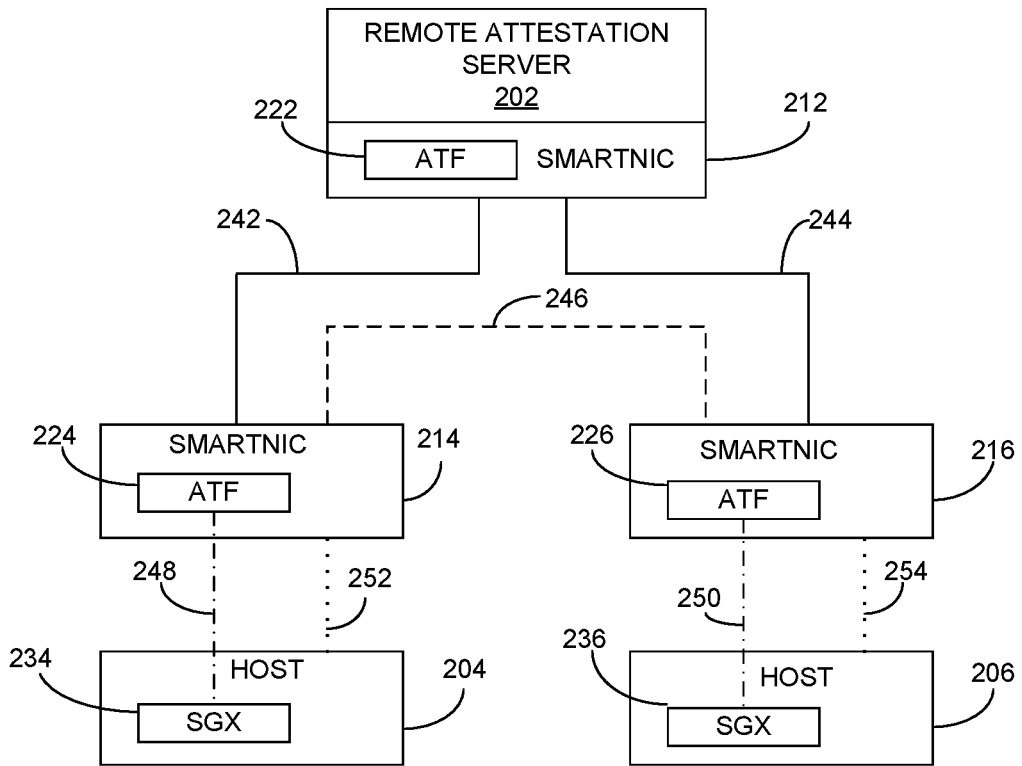
FIG. 2 presents a diagram illustrates communications within an exemplary secure network group, according to one embodiment.

FIG. 2 presents a diagram illustrating communications within an exemplary secure network group, according to one embodiment. In FIG. 2, a secure network group (also referred to as trusted network group) 200 includes a remote attestation server (also referred to as a service provider server) 202 and hosts 204 and 206. Each of attestation server 202 and hosts 204 and 206 can be coupled to a SmartNIC module for interfacing with each other. More specifically, attestation server 202 can be coupled to SmartNIC module 212, and hosts 204 and 206 can be coupled to SmartNIC modules 214 and 216, respectively. Attestation server 202 can communicate with host 204 via SmartNIC modules 212 and 214. Similarly, attestation server 202 can communicate with host 206 via SmartNIC modules 212 and 216. Moreover, hosts 204 and 206 can communicate with each other via SmartNIC modules 214 and 216. Each SmartNIC module can include an embedded ATF unit. For example, Smart-NIC modules 212, 214, and 216 can include ATF units 222, 224, and 226, respectively. The embedded ATF units can store initial encryption keys (e.g., a private key of the public/private key pair) used for initial communication between hosts or between a host and a service provider (SP) server.

Remote attestation or service provider server 202 can be responsible for providing services to or running applications on a host machine. Before providing services, service provider server 202 needs to perform remote attestation on the software or applications running on the host machine. More specifically, remote attestation server 202 can be responsible for verifying that software (or applications) running on a host are running on a trusted platform (e.g., an SGX-enabled platform) and for verifying the software's integrity and identity. In some embodiments, these verification operations can be enabled by the remote attestation mechanism provided by Intel SGX. Remote attestation server 202 can also generate a number of encryption keys (e.g., symmetric keys) that can be distributed to the host computer after the successful attestation of the trusted platform as well as the application running on the platform. Such encryption keys can facilitate secure communication among the hosts. In some embodiments, remote attestation server 202 can distribute a set of encryption keys to each host within a trusted network to facilitate secure in-network communication. More specifically, a host can select, based on a key-mapping table, a particular key from the set of received keys for communication with a particular host. Such a key-mapping table can also be distributed by remote attestation server 202 among the hosts in the trusted network.

Each host (e.g., host 204 or host 206) can be Intel SGX-enabled, meaning that the CPU of the host (not shown in FIG. 2) can include an embedded SGX module and can be configured to enable the SGX functionalities. For example, hosts 204 and 206 can include SGX modules 234 and 236, respectively. The remote attestation mechanism provided by the SGX module facilitates remote attestation server 202 to verify that an application supported by the SGX is running on a trusted platform and to verify the identity and integrity of the application.

FIG. 2 also illustrates the various types of secure communication channels in secure network group 200. The first type of secure communication channels exists between remote attestation server 202 and the SmartNIC of a host, as indicated by solid lines 242 and 244. An original static key generated by the ATF module of the SmartNIC can be used to encrypt packets going back and forth between service provider server 202 and the SmartNIC of the host.

A second type of secure communication channels exists between the SmartNICs of hosts within secure network group 200 (e.g., hosts 204 and 206), as indicated by a dashed line 246. This secure communication channel allows encrypted packets to be sent between the SmartNICs of the hosts using secret keys provisioned to the hosts by service provider server 202. In some embodiments, the encryption keys used by the hosts for in-group communications can be time-varying and can be referred to as ephemeral keys. Detailed descriptions regarding the provisioning of the ephemeral keys will follow.

A third type of secure communication channels exists between the SmartNIC and the SGX module of each host, as indicated by the dash-dotted lines 248 and 250. Such secure communication channels can be protected by a symmetric key generated by the SGX module and can be referred to as an SGX-to-NIC (s-n) key. Note that such a symmetric key can be passed from the SGX module to the SmartNIC using a public key of the ATF module within the SmartNIC. A detailed description regarding the distribution of the s-n key will follow.

FIG. 2 also illustrates a regular, unprotected communication channel between the SmartNIC and the unprotected region within a host, as indicated by dotted lines 252 and 254.

Figure 3:
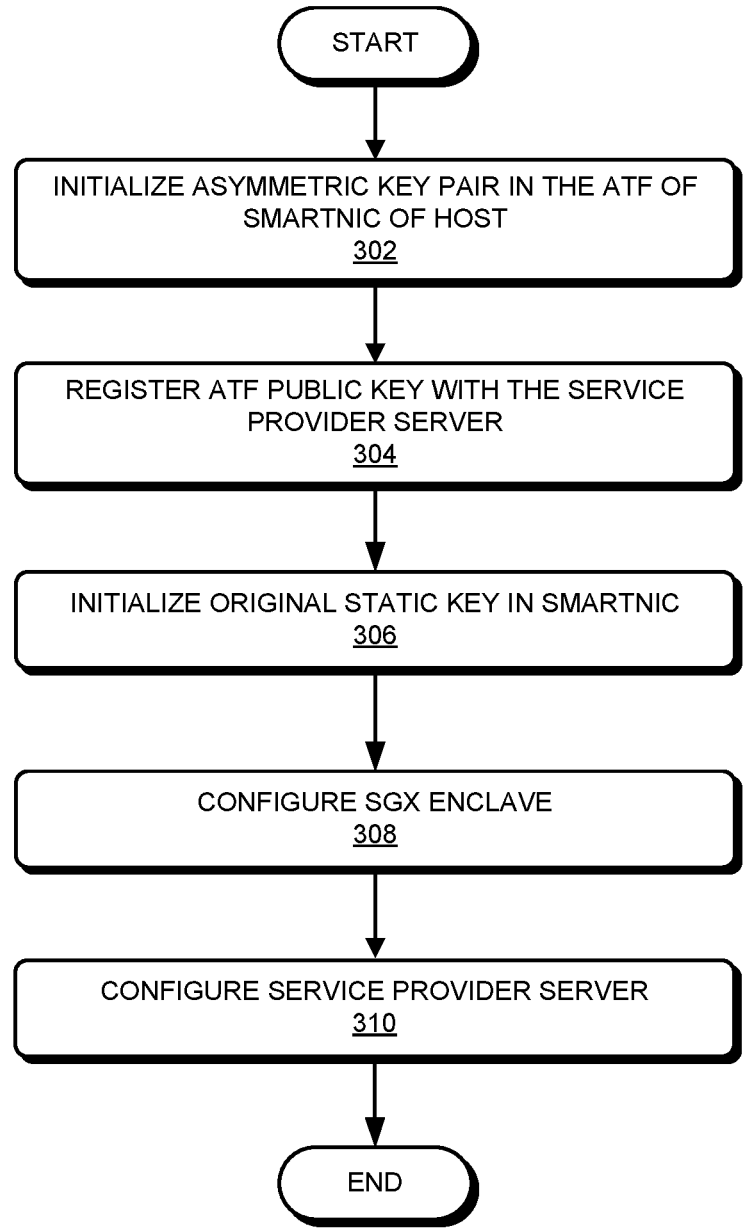
FIG. 3 presents a flowchart illustrating an exemplary configuration process, according to one embodiment.

Before a secure network group can be established, the various components (e.g., the service provider server, the hosts, and their corresponding SmartNICs) within the secure network need to be configured. It is assumed that the configuration operation can be performed in a secure environment, before the hosts within the secure network are brought online. FIG. 3 presents a flowchart illustrating an exemplary configuration process, according to one embodiment.

During configuration, an asymmetric key pair (e.g., an RSA (Rivest-Shamir-Adleman) public/private key pair) can be initialized in the ATF module within the SmartNIC of each host (operation 302). Such a key pair can represent the identity of the SmartNIC and is protected by the ATF. More specifically, the private key of the key pair will always remain inside the ATF. Subsequently, the public key of the asymmetric key pair of the SmartNIC can be registered with the service provider (operation 304). For example, such an asymmetric key pair can be stored into a key database maintained by the service provider. Registering the public key with the service provider allows the host to establish a secure, ATF-protected communication channel with the service provider server. Various mechanisms can be used to register the public key with the service provider server, including registration via a previously established secure channel or manual registration.

Additional steps to configure the SmartNIC of a host can also include initiating an original symmetric and static key in the SmartNIC (operation 306) to allow the SmartNIC of the host to communicate securely with the SmartNIC of the service provider. To do so, the original symmetric static key can also be sent to the SmartNIC of the service provider server using the ATF public key of the SmartNIC of the service provider server. It is assumed that the ATF public key of the SmartNIC of the service provider server is known to all hosts, and that the ATF private key of that SmartNIC never leaves the ATF module. In addition to configuring the SmartNICs, the configuration operation can also include configuring the SGX enclave within the host (operation 308) and configuring the service provider server (operation 310).

Subsequent to the initial configuration, the hosts and the service provider server can exchange encryption/decryption keys in order to establish secure communication channels. More specifically, to ensure security, the key exchange process can be facilitated by the remote attestation mechanism provided by the Intel SGX. More specifically, through remote attestation, the service provider server can establish a trusted channel to the SGX enclave within the host, and can subsequently send encryption keys used among the hosts to the SGX enclave. The SGX enclave can then pass such encryption keys to the corresponding SmartNIC to allow the SmartNIC to encrypt packages exchanged among the hosts.

Figure 4:
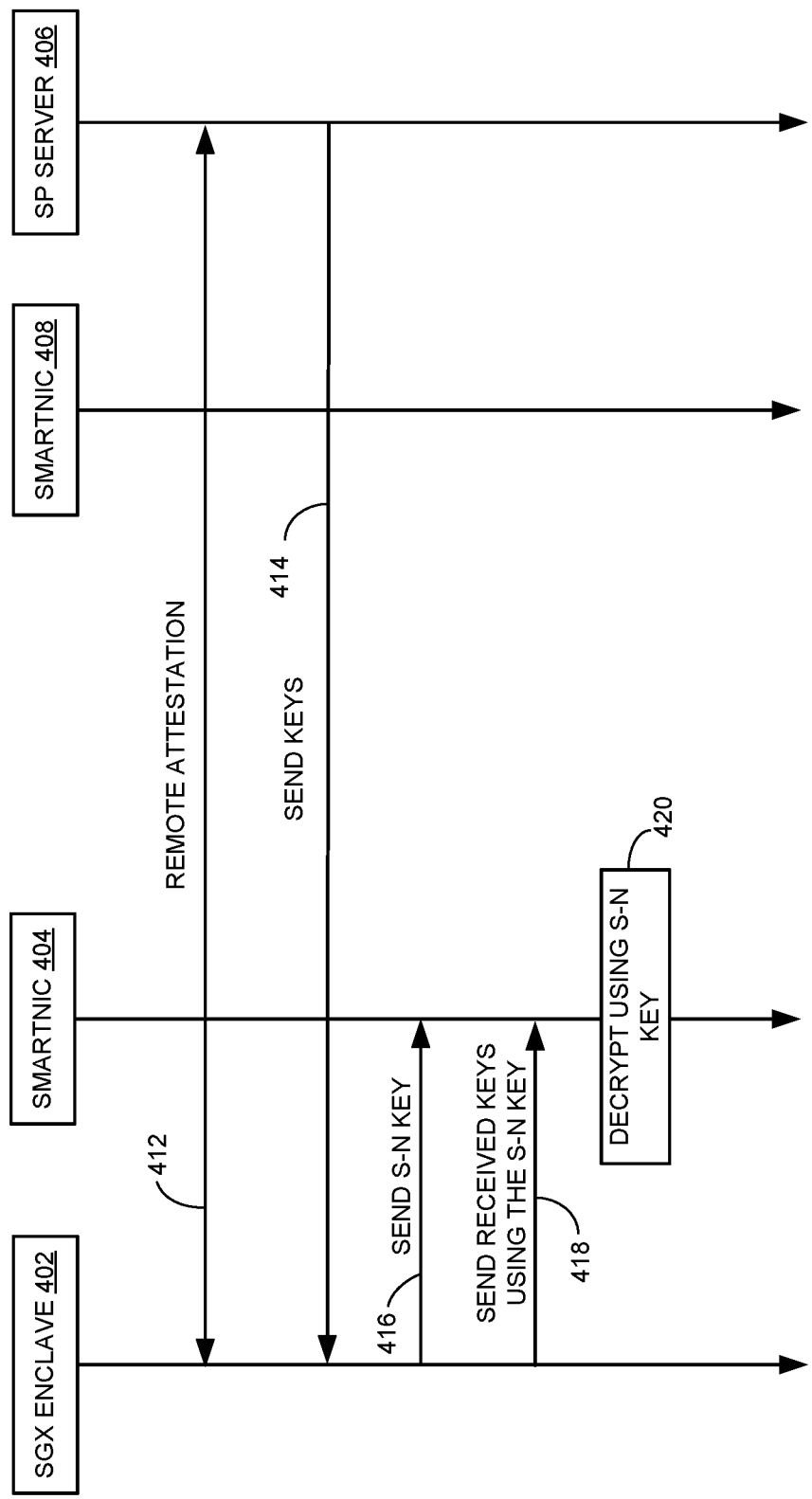
FIG. 4 presents a time-space diagram illustrating an exemplary process for key distribution, according to one embodiment.

FIG. 4 presents a time-space diagram illustrating an exemplary process for key distribution, according to one embodiment. More specifically, the key-distribution process can involve SGX enclave 402 of a client, SmartNIC module 404 of the client, service provider server 406, and SmartNIC module 408 of the service provider server 406. Note that, after the configuration operations, SmartNIC module 404 of the client and SmartNIC module 408 of service provider server 406 each holds the original static key and can perform secure communication using the original static key.

During key distribution, a remote attestation operation (operation 412) can be performed between SGX enclave 402 and service provider server 406. Note that, during remote attestation, messages exchanged between SGX enclave 402 and service provider server 406 are protected, in the application layer, by a specific attestation key, which is a secret key embedded in SGX enclave 402. Moreover, packets exchanged between the SmartNIC modules 404 and 408 are also encrypted, in the TCP (transport communication protocol) layer, using the original static key. More specifically, SmartNIC modules 404 and 408 are responsible for encryption and decryption of the packets. Because a packet is first encrypted at one SmartNIC module and decrypted at the other, such an encryption/decryption operation can be transparent to SGX enclave 402 and service provide server 406.

Subsequent to the remote attestation, service provider server 406 verifies that SGX enclave 402 is trustworthy and can provision encryption keys for the client machine via SGX enclave 402. More specifically, service provider server 406 can distribute a set of secret keys among a group of clients to allow clients within the group to communicate with each other in a secure manner. The key provision process starts with service provider server 406 sending a plurality of encryption keys to SGX enclave 402 via SmartNIC module 404 and SmartNIC module 408 (operation 414). In some embodiments, the encryption keys can include a set of ephemeral keys along with a host-key mapping table, and the ATF public key of SmartNIC module 404. In a further embodiment, a rotated version of the original static key can also be included. To ensure security, the message including all these keys can be protected (e.g., encrypted) using the attestation key that is protected by SGX enclave 402. Moreover, SmartNICs 404 and 408 can perform the standard encryption/decryption operation in the TCP layer using the original static key. As discussed previously, such operations are transparent to SGX enclave 402 and service provider server 406. Note that although the trust between SGX enclave 402 and service provider server 406 has been established, the trust or a secure channel between SGX module 402 and SmartNIC module 404 is not yet established.

To establish a secure channel to SmartNIC module 404, upon receiving the set of keys (which includes the ATF public key of SmartNIC module 404) from service provider server 406, SGX enclave 402 can generate and send an SGX-to-NIC (s-n) key to SmartNIC module 404 (operation 416). Such a message can be protected using the ATF public key of SmartNIC module 404. SmartNIC module 404 can obtain the s-n key by decrypting the message using its own private key. The s-n key can be a symmetric key, thus enabling more efficient secure communication between SGX enclave 402 and SmartNIC module 404. In other words, the first communication between SGX enclave 402 and SmartNIC module 404 can be protected using the asymmetric key provided by the ATF module, and subsequent communications can be protected by the s-n symmetric key in order to increase efficiency.

Subsequently, SGX enclave 402 can send the set of keys received from service provider server 406 to SmartNIC module 404 using the s-n key (operation 418). In some embodiments, SGX enclave 402 can send the set of ephemeral keys and the corresponding host-key mapping table to SmartNIC module 404. The set of ephemeral keys allows SmartNIC module 404 to establish secure communication channels with other SmartNIC modules of other hosts. In some embodiments, the number of ephemeral keys matches the number of other hosts within the secure group. For example, if there are n hosts in the secure group, there will be n−1 encryption keys to allow a particular host to communicate with every other host using a different key. A respective entry in the host-key mapping table specifies the particular key that should be used by SmartNIC module 404 for encrypting/decrypting packets exchanged between SmartNIC module 404 and a corresponding SmartNIC module of a particular host. For example, such an entry can map a key identifier (ID) to a host ID. When the host coupled to SmartNIC module 404 needs to communicate with a different host within the secure group, SmartNIC module 404 can look up the host-key mapping table to obtain a key corresponding to the different host. The set of ephemeral keys and the key-host mapping table can be sent periodically or on demand by service provider server 406 to SGX enclave 402, which then forwards the set of ephemeral keys and the mapping table to SmartNIC module 404. It is also possible for service provider server 406 to send a single key to SmartNIC module 404, meaning that SmartNIC module 404 is required to use the same key to establish secure communication channels with all other hosts that also receive the same key from service provider server 406.

In the event of SGX enclave 402 also receiving a rotated static key, SGX enclave 402 can also send the rotated static key to SmartNIC module 404. Rotating the static key can enhance the security of the communication between SmartNIC modules 404 and 408. In addition to key rotation, other key ratcheting mechanisms can also be used to update the encryption key used between the SmartNIC of the host and the SmartNIC of the service provider server. For example, an update of the key can include a hash function of the original static key.

Upon receiving encrypted information from SGX enclave 402, SmartNIC module 404 performs a decryption operation using the previously received s-n key to obtain the set of ephemeral keys and the mapping table (operation 420). This operation ends the key-provisioning operation. More specifically, after receiving the set of ephemeral keys and the key-host mapping table, each host can now communicate with other hosts securely using the set of received ephemeral keys. As one can see from FIG. 4, the secrecy or security of the ephemeral keys is protected by the SGX module embedded in the host CPU, as well as by the ATF module embedded in the SmartNIC of the host. Such hardware-assist key-provisioning can provide a much higher level of security than conventional key-provisioning schemes.

Figure 5:
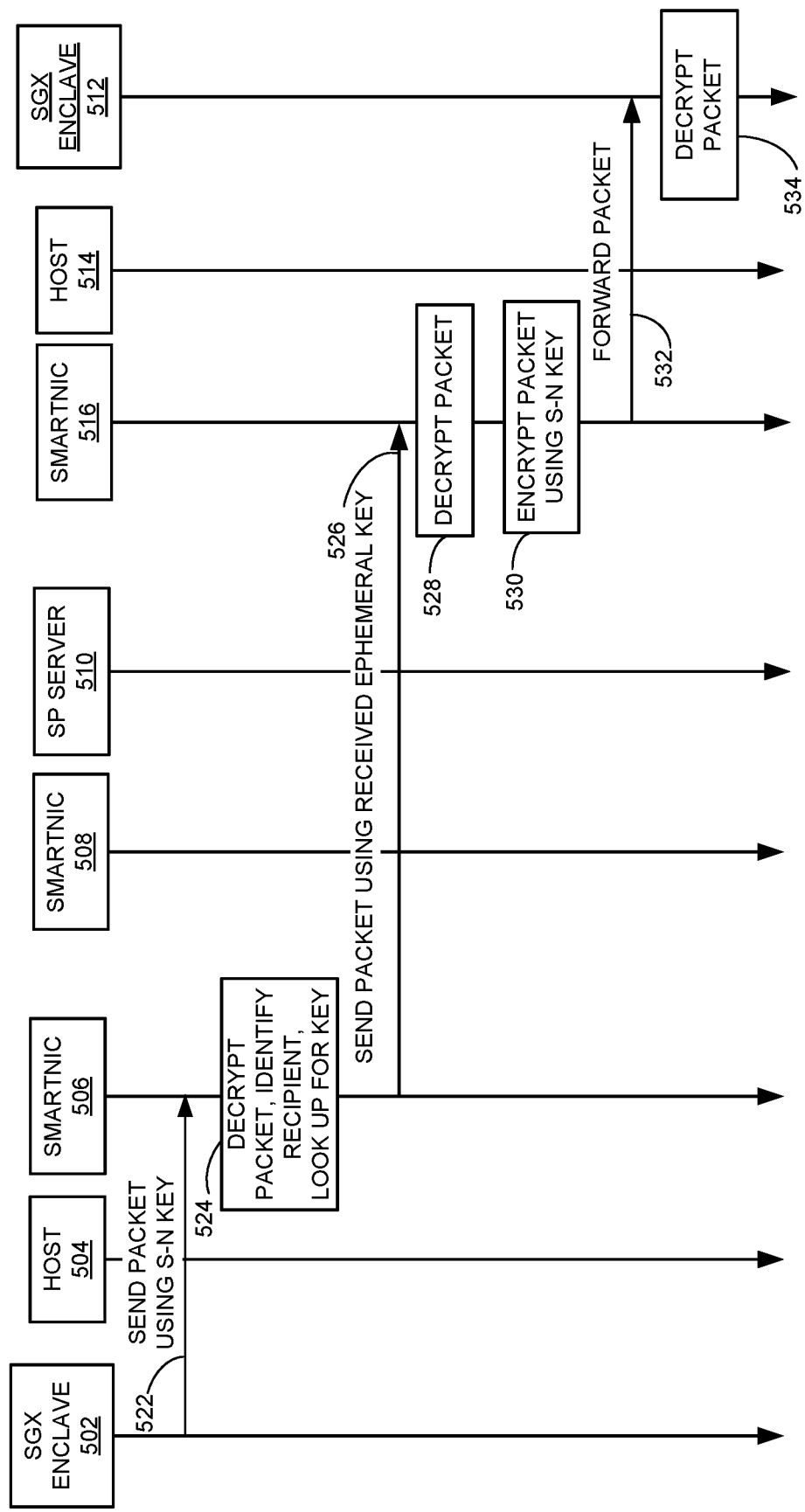
FIG. 5 presents a diagram illustrating various types of secure communications within a secure network group, according to one embodiment.
Figure 5:
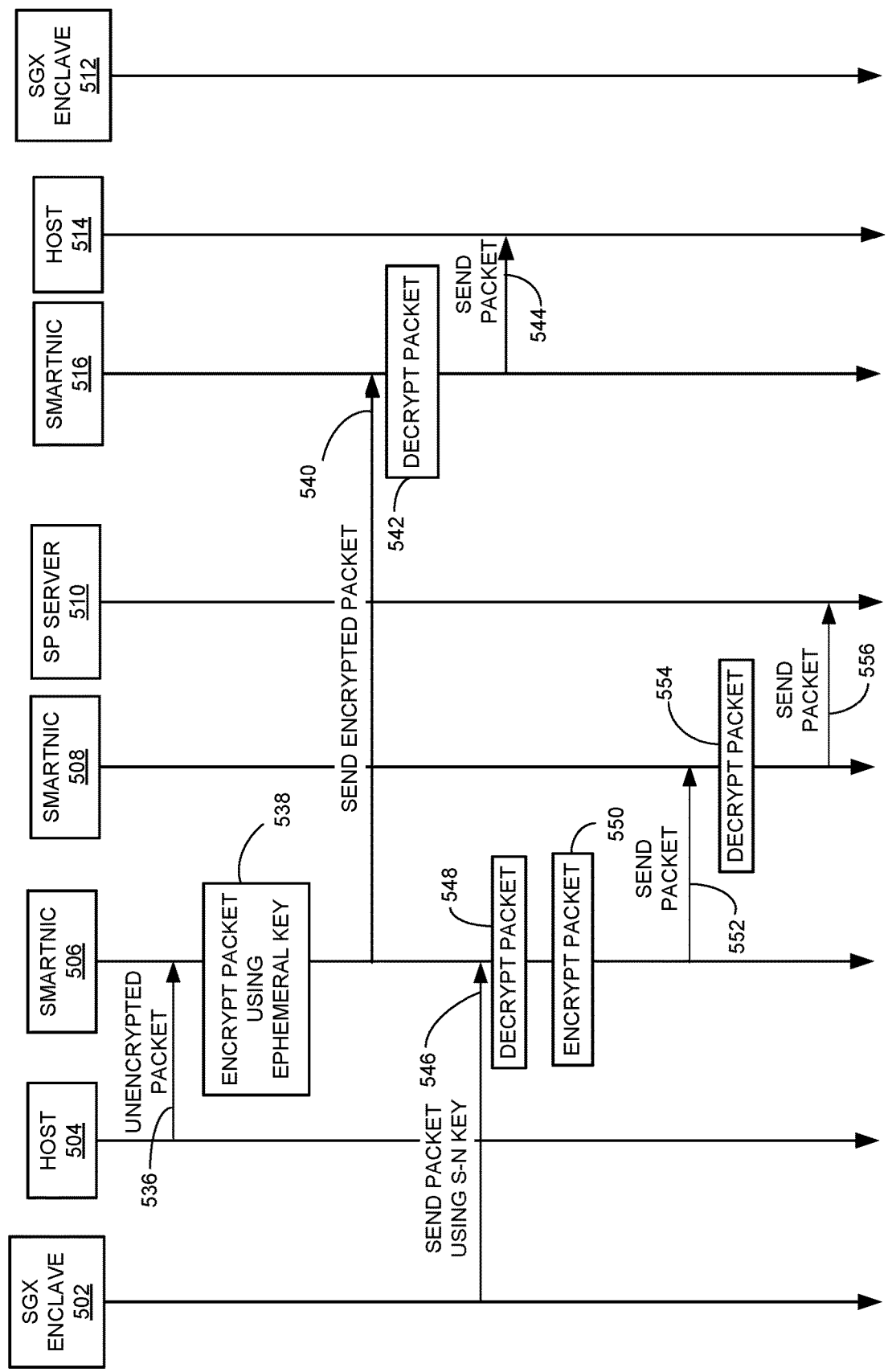

FIG. 5 presents a diagram illustrating various types of secure communications within a secure network group, according to one embodiment. In FIG. 5, a secure network group can include a first client comprising an SGX enclave 502, a host 504, and a SmartNIC module 506; a second client comprising an SGX enclave 512, a host 514, and a SmartNIC module 516; a service provider server 510, and a SmartNIC module 508 of service provider server 510. Note that here hosts 504 and 514 refer to the unprotected regions (i.e., regions not protected by the SGX) within the CPUs of the first and second clients, respectively.

During operation, SGX enclave 502 of the first client can communicate with SGX enclave 512 of the second client by sending an encrypted packet to SmartNIC module 506 using the s-n key (operation 522). For example, an application running in SGX enclave 502 can communicate with an application running in SGX enclave 512. SmartNIC module 506 can decrypt the packet, identify the second client as the recipient of the packet, and look up in the host-key mapping table to obtain the corresponding ephemeral key (operation 524). SmartNIC module 506 can then encrypt the packet using the corresponding ephemeral key and send the encrypted packet to SmartNIC module 516 (operation 526). SmartNIC module 516 can then decrypt the packet using the corresponding ephemeral key (operation 528). More specifically, SmartNIC module 516 can also perform a table lookup to find the corresponding ephemeral key based on the identity of the sender of the packet.

Subsequently, SmartNIC module 516 can then encrypt the packet using an s-n key shared between SmartNIC module 508 and SGX enclave 512 (operation 530) and forward the packet to SGX enclave 512 (operation 532). SGX enclave 512 can decrypt the packet using the shared s-n key to obtain the secret message sent by SGX enclave 502 (operation 534).

In addition to the communication between the SGX enclaves, applications running in the unsecure area within the CPUs of the first and second clients may also communicate with each other. In such a scenario, there is no longer a need to encrypt the packets using the s-n key. In fact, packets can be sent from the unsecured area within the client CPU directly to the corresponding SmartNIC modules. On the other hand, packets exchanged between SmartNIC modules are still encrypted using a corresponding ephemeral key shared between the SmartNIC modules. Note that the s-n key protects secure content within the SGX enclave from being accessible to untrusted applications running outside the SGX enclave when such content leaves the SGX enclave while being transmitted to the corresponding SmartNIC.

In FIG. 5, host 504 can communicate with host 514 by sending an unencrypted packet to SmartNIC module 506 (operation 536). SmartNIC module 506 identifies the receiving host, performs a table lookup to obtain an ephemeral key, and encrypts the packet using the ephemeral key (operation 538). SmartNIC module 506 then sends the encrypted packet to SmartNIC module 516 (operation 540). SmartNIC module 516 decrypts the packet using a corresponding ephemeral key (operation 542) and sends the decrypted packet to host 514 (operation 544).

FIG. 5 also shows the secure communication between the SGX enclave of a client and the service provider server. More specifically, SGX enclave 502 can communicate with server provider server 510 by sending an encrypted packet to SmartNIC module 506 (operation 546). The packet can be encrypted using the s-n key shared between SGX enclave 502 and SmartNIC module 506. SmartNIC module 506 decrypts the packet using the shared s-n key (operation 548) and then encrypts the packet using a symmetric key shared between SmartNIC modules 504 and 508 (operation 550). In some embodiments, such a shared key can be a static key or a rotated version of the static key. SmartNIC module 506 can then send the encrypted packet to SmartNIC module 508 of service provider server 510 (operation 552). SmartNIC module 508 also has a copy of the currently active rotated static key and can decrypt the received packet using such a key (operation 554). SmartNIC module 508 can then forward the decrypted packet to service provider server 510 (operation 556).

It is also possible for an application running in the unsecured region within the CPU of a client machine to communicate with the service provider server. In such a scenario, there is no longer a need to send the encrypted packet to the SmartNIC module of the client. However, the SmartNIC module of the client can still encrypt the packet using the static key or the rotated static key.

Cascaded Secure Network

In the examples shown in FIGS. 2-5, all host computers belong to a single secure network. In practice, in addition to the single layer secure network, it is also possible to construct a secure network that includes multiple sub-networks, with each sub-network including a service provider server and a set of host computers, and the host computers within each sub-network can securely communicate with each other using a set of keys distributed by the service provider server among the set of host computers. Moreover, a global service provider server can distribute a different set of keys among the different sub-networks to facilitate inter-sub-network secure communication. Each sub-network can also be referred to as a network group, with the communication within the sub-network referred to as in-group communication and the communication between sub-networks referred to as inter-group communication.

Figure 6:
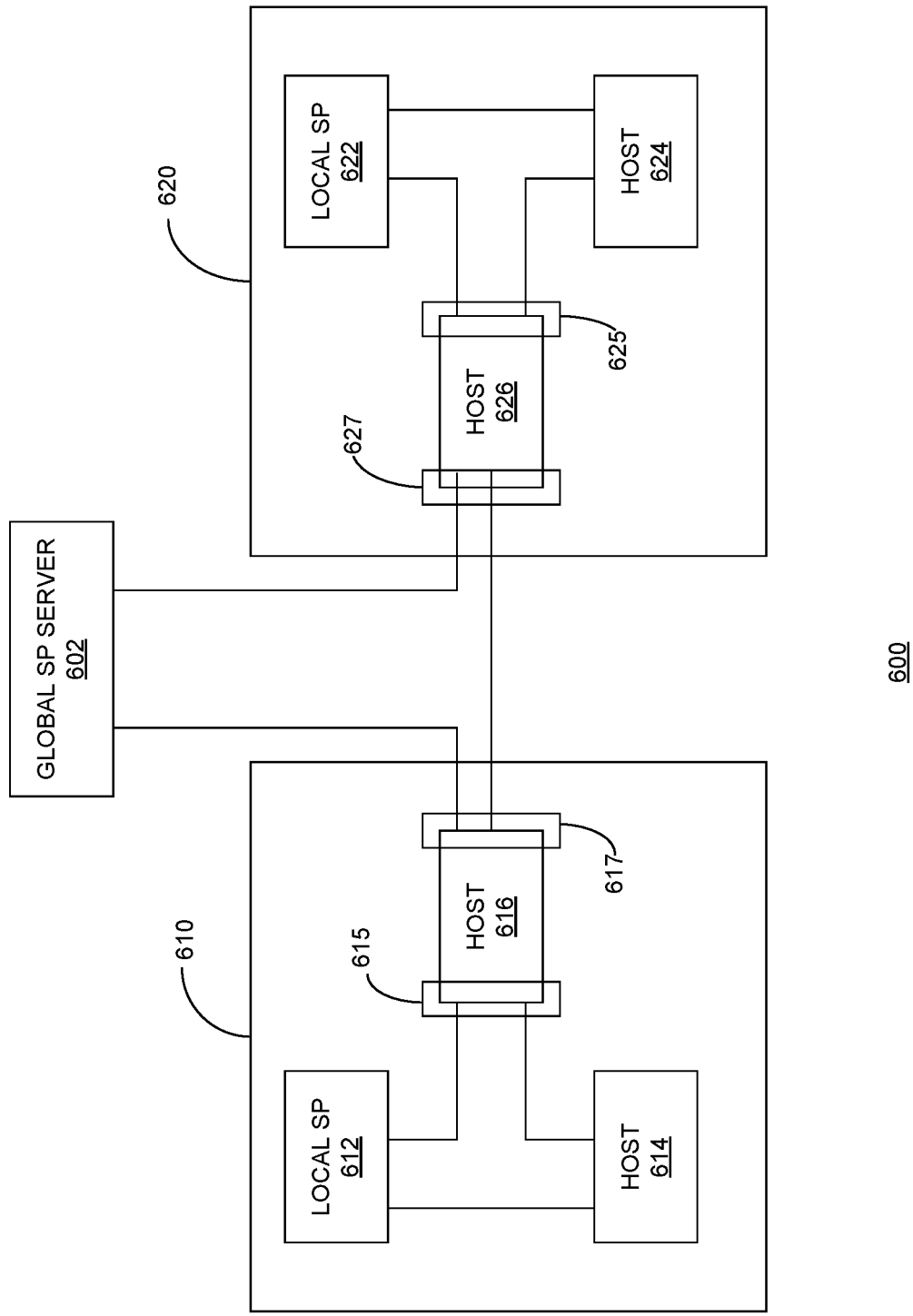
FIG. 6 illustrates an exemplary secure network that includes multiple network groups, according to one embodiment.

FIG. 6 illustrates an exemplary secure network that includes multiple network groups, according to one embodiment. Secure network 600 can include a global service provider (SP) server 602 and a plurality of network groups (i.e., network groups 610 and 620). Each network group can also include a local service provider server and a number of host computers. For example, network group 610 can include local SP server 612 and hosts 614 and 616, and network group 620 can include local SP server 622 and hosts 624 and 626. Moreover, a particular host in each network group can act as a gateway to facilitate inter-group communication. In the example shown in FIG. 6, host 616 can act as a gateway for network group 610, while host 626 can act as a gateway for network group 620.

Global SP server 602 can be responsible for distributing various encryption keys (referred to as inter-group keys) to the gateway of each network group, thus allowing the different network groups to communicate with each other using the inter-group keys. The distribution of the inter-group keys can use a process similar to what is shown in FIG. 4. More specifically, each gateway host can be SGX-enabled, and global SP server 602 can use the SGX remote attestation mechanism to build a trusted channel to the SGX enclave of the gateway host. The gateway host can include at least two SmartNIC interfaces (e.g., two ports on a SmartNIC module), with one SmartNIC interface assigned for the inter-group communication and one SmartNIC interface assigned for the in-group communication. The SGX enclave can securely transfer the inter-group keys to the SmartNIC interface assigned for the inter-group communication.

In the example shown in FIG. 6, gateway host 616 can include a SmartNIC interface 615 for the in-group communication and a SmartNIC interface 617 for the inter-group communication. In other words, packets destined to hosts within network group 610 will be transmitted via SmartNIC interface 615, whereas packets destined to hosts outside of network group 610 will be transmitted via SmartNIC interface 617. Similarly, gateway host 626 can include a SmartNIC interface 625 for the in-group communication and a SmartNIC interface 627 for the inter-group communication. Gateway hosts 616 and 626 can communicate with each other in a secure manner using the inter-group keys distributed by global SP server 602.

A local SP server (e.g., local SP server 612 or 622) can be responsible for distributing the encryption keys that can be used for the in-group communication, thus allowing the different hosts within the network group to communicate with each other securely using the distributed in-group keys. The key-distribution process of the in-group keys can be similar to the one shown in FIG. 4. More specifically, each host within the network group can be SGX-enabled, and the local SP server can use the SGX remote attestation mechanism to build a trusted channel to the SGX enclave of each host and can send the in-group keys to the SGX enclave of each host. Note that, although not shown in FIG. 6, the hosts and the local SP server each can include a SmartNIC module. The SGX enclave of a host can transfer the in-group key securely to the corresponding SmartNIC interface. In the case of a gateway host, the SGX enclave of the gateway host can transfer the in-group key to the SmartNIC interface assigned for the in-group communication. For example, when local SP server 612 sends the in-group key to the SGX enclave of gateway host 616, the SGX enclave of the gateway host 616 can transfer the in-group key to SmartNIC interface 615, thus facilitating communication between hosts 616 and 614 via SmartNIC interface 615.

When a first host (e.g., host 614) in a first network group (e.g., network group 610) communicates with a second host (e.g., host 624) in a second network group (e.g., network group 620), host 614 can send a packet to gateway host 616 using the in-group key of network group 610. Gateway host 616 receives the packet via SmartNIC interface 615 and decrypts the packet using the in-group key of network group 610. In response to determining that the packet is destined to the second network group, gateway host 616 encrypts the packet using the inter-group key maintained by SmartNIC interface 617 and sends the encrypted packet to gateway host 626 via SmartNIC interface 617.

Gateway host 626 receives the encrypted packet on SmartNIC interface 627 and decrypts the packet using the inter-group key maintained by SmartNIC interface 627. In response to determining that the packet is for a different host (e.g., host 624) inside network group 620, gateway host 626 can encrypt the packet using the in-group key of network group 620 maintained by SmartNIC interface 625. Gateway host 626 can then send the encrypted packet to host 624 via SmartNIC interface 625. Upon receiving the packet, a corresponding SmartNIC interface on host 624 can decrypt the packet to obtain the content.

In this example, it is assumed that the applications involved in the inter-group communication run outside of the SGX enclave of each host. In the event of the application running inside the SGX enclave, additional data encryption/decryption may be needed between the SGX enclave of the SmartNIC interface, similar to the example shown in FIG. 5.

The Apparatus

Figure 7:
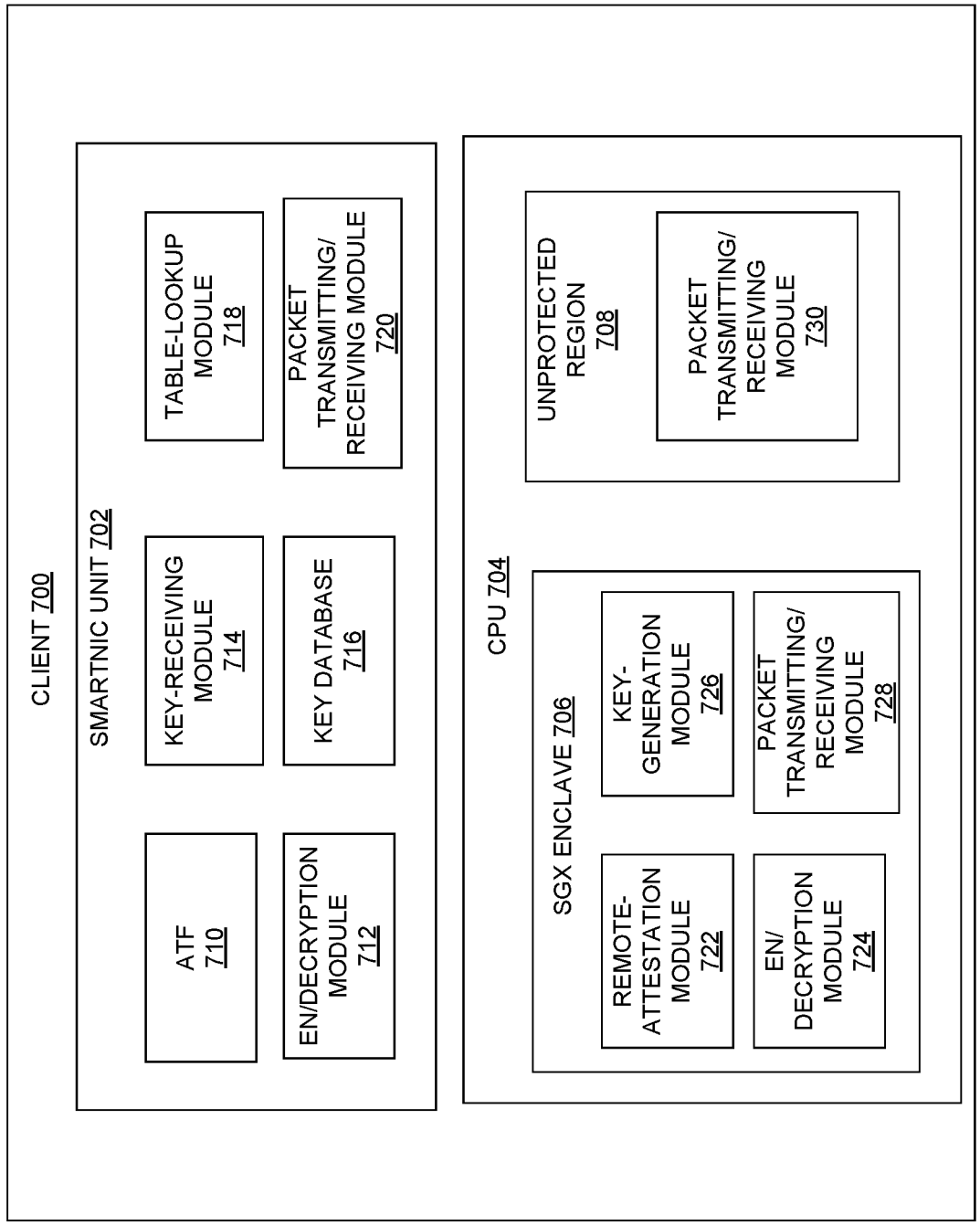
FIG. 7 illustrates the architecture of an exemplary client computer, according to one embodiment.

FIG. 7 illustrates the architecture of an exemplary client computer, according to one embodiment. A client 700 can include a SmartNIC unit 702 and a CPU 704. CPU 704 can include an SGX enclave 706 and unprotected region 708.

More specially, SmartNIC unit 702 can include an ATF module 710, an encryption/decryption module 712, a key-receiving module 714, a key database 716, a table-lookup module 718, and a packet transmitting/receiving module 720. SGX-enclave 706 can include a remote-attestation module 722, an encryption/decryption module 724, a key-generation module 726, and a packet transmitting/receiving module 728. Unprotected region 708 within CPU 704 can include a packet transmitting/receiving module 730.

ATF module 710 can ensure the security of the ATF private key. Moreover, by registering the ATF public key with a service provider server, ATF module 710 can facilitate the secure communicate between SmartNIC unit 702 and the service provider server. Encryption/decryption module 712 can be responsible for encrypting the outgoing packets and decrypting the incoming packets. Depending on the recipient or sender of a packet, encryption/decryption module 712 may select an appropriate key for the encryption or decryption operation. For example, if a packet is destined to a service provider server, encryption/decryption module 712 can select a current rotated version of an original static key shared between SmartNIC unit 702 and the service provider server. On the other hand, if the packet is destined to a different client machine within the same network group, encryption/decryption module 712 can select an ephemeral key previously distributed by the service provider server. Moreover, if the packet is destined to SGX-enclave 706, encryption/decryption module 712 can select the s-n key shared between SmartNIC unit 702 and SGX-enclave 706.

Key-receiving module 714 can be responsible for receiving encryption/decryption keys distributed by the service provider server or SGX-enclave 706. Key database 716 can be responsible for storing these received encryption keys. Table-lookup module 718 can be responsible for performing a table lookup when selecting a particular ephemeral key to encrypt a packet that is to be sent to a different client machine. More specifically, depending on the identity of the destination client machine, a particular key can be select from the set of ephemeral keys distributed to client 700 by the service provider server. Packet transmitting/receiving module 720 can be responsible for transmitting and receiving packets. Note that, if client 700 is gateway machine for a network group within a cascaded secure network, SmartNIC unit 702 can include at least two ports, one for the in-group communication and one for the inter-group communication. Moreover, in such a scenario, each module within SmartNIC unit 702 needs to be able to handle both the in-group and the inter-group communication. For example, depending on whether a packet belongs to an in-group or inter-group communication, encryption/decryption module 712 may select an in-group key or inter-group encryption key. Similarly, transmitting/receiving module 730 may transmit the packet from a different port depending on whether the packet belongs to the in-group or inter-group communication.

Remote-attestation module 722 residing in SGX-enclave 706 can be responsible for remote attestation of SGX-enclave 706. Encryption/decryption module 724 can be responsible for encrypting and decrypting packets going out of and coming into SGX-enclave 706, respectively. Key-generation module 726 can be responsible for generating a symmetric key shared between SGX-enclave 706 and SmartNIC unit 702, i.e., the s-n key. Packet transmitting/receiving module 728 can be responsible for transmitting packets going out of and receiving packets coming into SGX-enclave 706, respectively. Similarly, packet transmitting/receiving module 730 residing in unprotected region 708 of CPU 704 can be responsible for transmitting packets going out of and receiving packets coming into unprotected region 708.

Figure 8:
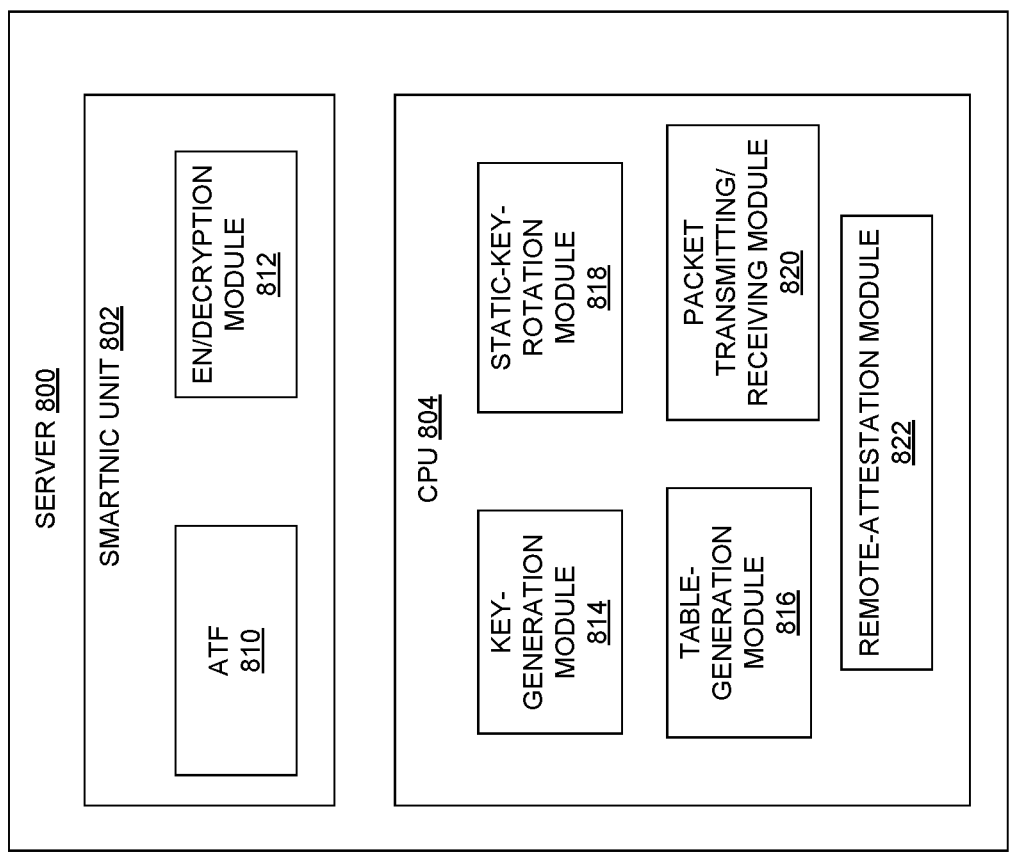
FIG. 8 illustrates the architecture of an exemplary server computer, according to one embodiment.

FIG. 8 illustrates the architecture of an exemplary server computer, according to one embodiment of the present invention. A server 800 can include a SmartNIC unit 802 and a CPU 804. Similar to SmartNIC 702 shown in FIG. 7, SmartNIC unit 802 can include an ATF module 810 and an encryption/decryption module 812. CPU 804 can include a key-generation module 814, a table-generation module 816, a static-key-rotation module 818, a packet transmitting/receiving module 820, and a remote attestation module 822.

ATF module 810 can be similar to ATF module 710. ATF module 810 can maintain the ATF private key, which facilitates secure communication between SmartNIC unit 802 and a client machine. Encryption/decryption module 812 can be responsible for encrypting and decrypting outgoing and incoming packets, respectively, with respect to server 800.

Key-generation module 814 can be responsible for generating the set of ephemeral keys that are distributed among hosts within a network group. In some embodiments, key-generation module 814 can periodically generate the ephemeral keys. Note that, in order to ensure that each individual pair of hosts within a network group can communicate with each other using a unique key, key-generation module 814 can generate a unique key for each individual pair of hosts within in the network group. Table-generation module 816 can be responsible for generating a key-host mapping table that maps a particular key to a particular pair of hosts. Both the generated ephemeral keys and the key-host mapping table can be transmitted to the hosts. In some embodiments, the ephemeral keys and the key-host mapping table may be organized based on the identity of the hosts. A subset of ephemeral keys that pertains to a particular host can be organized together along with the corresponding mapping table entries. This subset of ephemeral keys will then be sent to this particular host along with the corresponding entries in the matching table. In other words, each host will only receive keys that can be used for the secure communication with other hosts, but will not receive keys that are used between other hosts.

Static-key-rotation module 818 can be responsible for rotating an original static key shared between SmartNIC unit 802 of server 800 and the SmartNIC unit of a host. The original static key can be rotated periodically or on demand to ensure the communication security. Packet transmitting/receiving module 820 can be responsible for transmitting and receiving packets. Remote attention module 822 can be responsible for performing remote attestation on a remote entity.

In general, embodiments of the present invention provide a method and system for establishing trust among a group of host computers in a cloud computing environment. Such a method and system can involve a CPU-based remote attestation scheme as well as SmartNIC interfaces. The CPU-based attestation scheme (e.g., Intel SGX) can ensure that the identity of the remote entity is endorsed by the CPU, which has a much smaller attack surface, thus resulting in a safer and more robust secure network. In addition to Intel SGX, the host CPU may implement other types of TEE technology, such as Arm® TrustZone, AMD® Secure Technology, etc. The SmartNIC interfaces offload the encryption/decryption operations from the CPU, thus significantly increases the network speed. Moreover, the ATF module embedded in each SmartNIC can also provide hardware-assist trust. In addition to a physical host computers, in some embodiments, the host computers can also include one or more virtual machines (VMs) running on a cloud ECS (elastic compute service). As long as the VMs can enable remote attestation, a trusted network group can be established among the VMs.

Figure 9:
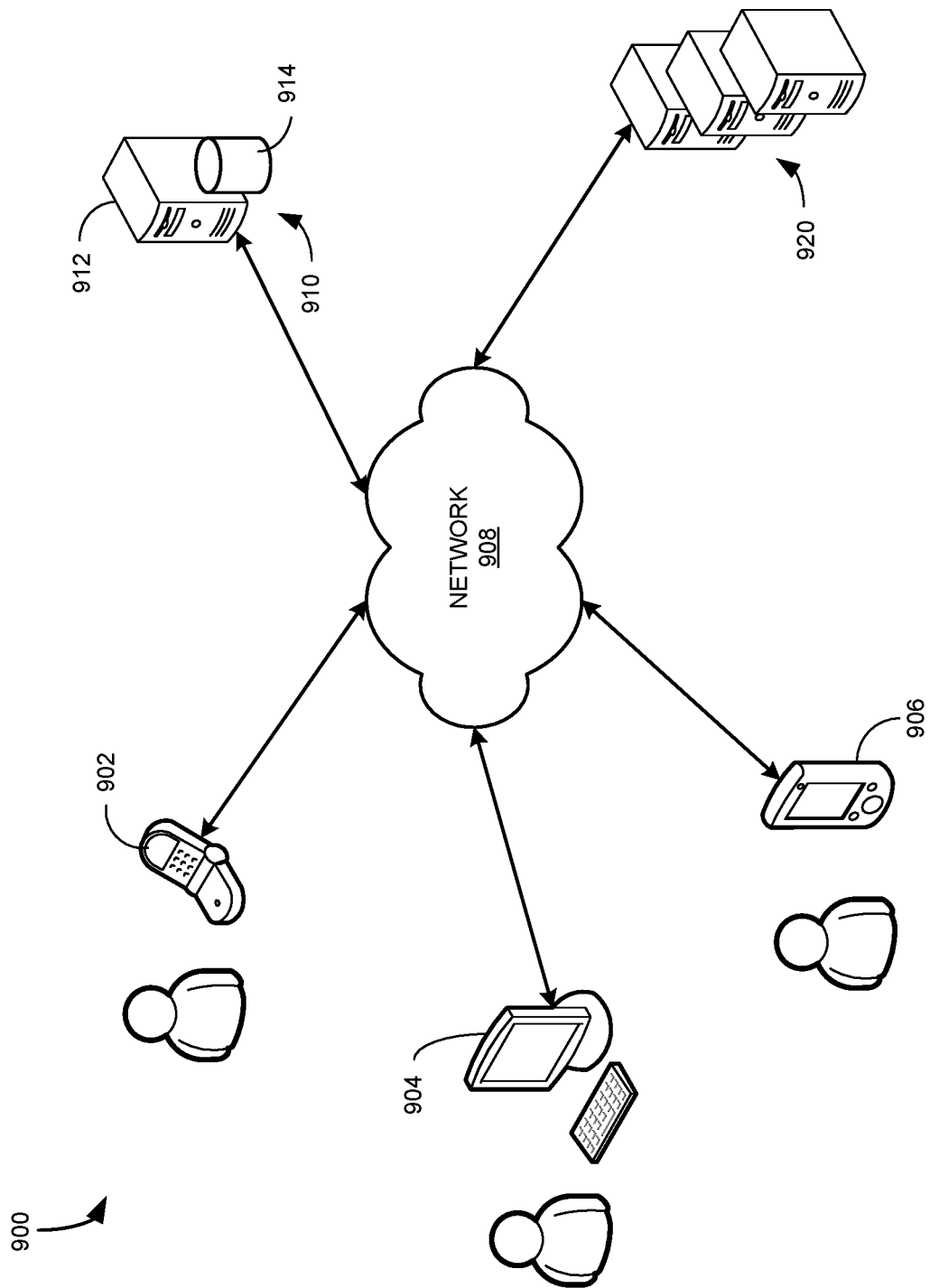
FIG. 9 illustrates an exemplary client-server network environment for implementing the disclosed technology for establishing a secure network, in accordance with some embodiments described herein.

FIG. 9 illustrates an exemplary client-server network environment for implementing the disclosed technology for establishing a secure network, in accordance with some embodiments described herein. A network environment 900 includes a number of electronic devices 902, 904 and 906 communicably connected to a server 910 by a network 908. One or more remote servers 920 are further coupled to the server 910 and/or the one or more electronic devices 902, 904 and 906.

In some exemplary embodiments, electronic devices 902, 904 and 906 can be computing devices such as laptop or desktop computers, smartphones, PDAs, portable media players, tablet computers, televisions or other displays with one or more processors coupled thereto or embedded therein, or other appropriate computing devices that can be used for displaying a web page or web application. In one example, the electronic devices 902, 904 and 906 store a user agent such as a browser or application. In the example of FIG. 9, electronic device 902 is depicted as a smartphone, electronic device 904 is depicted as a desktop computer, and electronic device 906 is depicted as a PDA.

Server 910 includes a processing device 912 and a data store 914. Processing device 912 executes computer instructions stored in data store 914, for example, to assist in scheduling a customer-initiated service or a service-provider-initiated service between a service provider and a customer at electronic devices 902, 904 and 906 during a service scheduling process.

In some exemplary aspects, server 910 can be a single computing device such as a computer server. In other embodiments, server 910 can represent more than one computing device working together to perform the actions of a server computer (e.g., cloud computing). The server 910 may host the web server communicably coupled to the browser at the client device (e.g., electronic devices 902, 904 or 906) via network 908. In one example, the server 910 may host a client application for scheduling a customer-initiated service or a service-provider-initiated service between a service provider and a customer during a service scheduling process. Server 910 may further be in communication with one or more remote servers 920 either through the network 908 or through another network or communication means.

The one or more remote servers 920 may perform various functionalities and/or storage capabilities described herein with regard to the server 910 either alone or in combination with server 910. Each of the one or more remote servers 920 may host various services. For example, servers 920 may host services providing information regarding one or more suggested locations such as web pages or websites associated with the suggested locations, services for determining the location of one or more users, or establishments, search engines for identifying results for a user query, one or more user review or query services, or one or more other services providing information regarding one or more establishments, customers and/or review or feedback regarding the establishments.

Server 910 may further maintain or be in communication with social networking services hosted on one or more remote servers 920. The one or more social networking services may provide various services and may enable users to create a profile and associate themselves with other users at a remote social networking service. The server 910 and/or the one or more remote servers 920 may further facilitate the generation and maintenance of a social graph including the user-created associations. The social graphs may include, for example, a list of all users of the remote social networking service and their associations with other users of a remote social networking service.

Each of the one or more remote servers 920 can be a single computing device such as a computer server or can represent more than one computing device working together to perform the actions of a server computer (e.g., cloud computing). In one embodiment server 910 and one or more remote servers 920 may be implemented as a single server or a cluster of servers. In one example, server 910 and one or more remote servers 920 may communicate through the user agent at the client device (e.g., electronic devices 902, 904 or 906) via network 908.

Users may interact with the system hosted by server 910, and/or one or more services hosted by remote servers 920, through a client application installed at the electronic devices 902, 904, and 906. Alternatively, the user may interact with the system and the one or more social networking services through a web-based browser application at the electronic devices 902, 904, 906. Communication among client devices 902, 904, 906 and the system, and/or one or more services, may be facilitated through a network (e.g., network 908).

Communications among the client devices 902, 904, 906, server 910 and/or one or more remote servers 920 may be facilitated through various communication protocols. In some aspects, client devices 902, 904, 906, server 910 and/or one or more remote servers 920 may communicate wirelessly through a communication interface (not shown), which may include digital signal processing circuitry where necessary. The communication interface may provide for communications under various modes or protocols, including Global System for Mobile communication (GSM) voice calls; Short Message Service (SMS), Enhanced Messaging Service (EMS), or Multimedia Messaging Service (MMS) messaging; Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, including via the use of a Bluetooth-enable device, WiFi, or other such transceiver.

Network 908 can include, for example, any one or more of a personal area network (PAN), a local area network (LAN), a campus area network (CAN), a metropolitan area network (MAN), a wide area network (WAN), a broadband network (BBN), the Internet, and the like. Further, network 908 can include, but is not limited to, any one or more of the following network topologies, including a bus network, a star network, a ring network, a mesh network, a star-bus network, a tree or hierarchical network, and the like.

Figure 10:
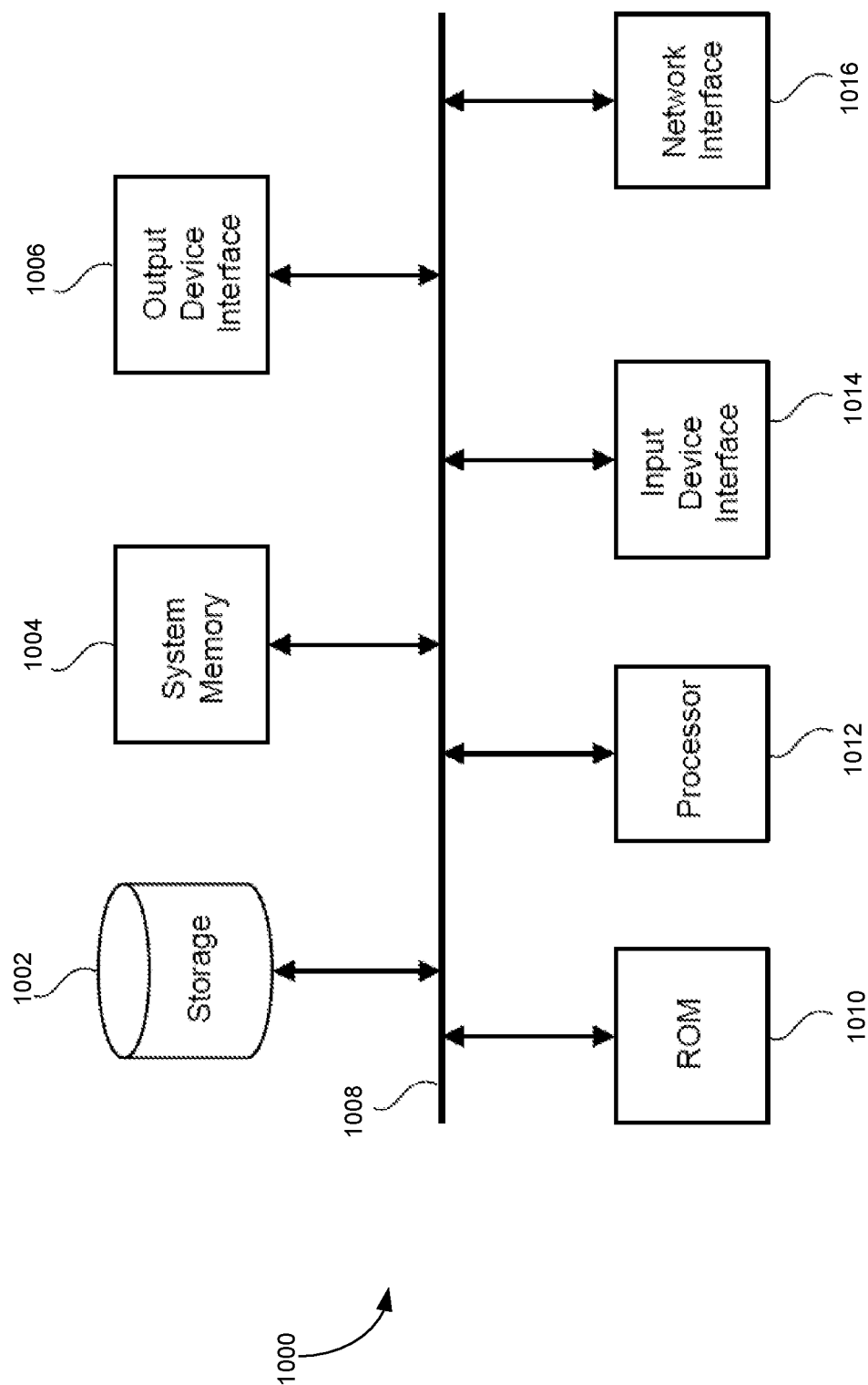
FIG. 10 conceptually illustrates an electronic system with which some implementations of the subject technology are implemented In the figures, like reference numerals refer to the same figure elements.

FIG. 10 conceptually illustrates an electronic system with which some implementations of the subject technology are implemented. Electronic system 1000 can be a client, a server, a computer, a smartphone, a PDA, a laptop, or a tablet computer with one or more processors embedded therein or coupled thereto, or any other sort of electronic device. Such an electronic system includes various types of computer-readable media and interfaces for various other types of computer-readable media. Electronic system 1000 includes a bus 1008, processing unit(s) 1012, a system memory 1004, a read-only memory (ROM) 1010, a permanent storage device 1002, an input device interface 1014, an output device interface 1006, and a network interface 1016.

Bus 1008 collectively represents all system, peripheral, and chipset buses that communicatively connect the numerous internal devices of electronic system 1000. For instance, bus 1008 communicatively connects processing unit(s) 1012 with ROM 1010, system memory 1004, and permanent storage device 1002.

From these various memory units, processing unit(s) 1012 retrieves instructions to execute and data to process in order to execute the processes of the subject disclosure. The processing unit(s) can be a single processor or a multicore processor in different implementations.

ROM 1010 stores static data and instructions that are needed by processing unit(s) 1012 and other modules of electronic system 1000. Permanent storage device 1002, on the other hand, is a read-and-write memory device. This device is a non-volatile memory unit that stores instructions and data even when electronic system 1000 is off. Some implementations of the subject disclosure use a mass-storage device (such as a magnetic or optical disk and its corresponding disk drive) as permanent storage device 1002.

Other implementations use a removable storage device (such as a floppy disk, flash drive, and its corresponding disk drive) as permanent storage device 1002. Like permanent storage device 1002, system memory 1004 is a read-and-write memory device. However, unlike storage device 1002, system memory 1004 is a volatile read-and-write memory, such a random access memory. System memory 1004 stores some of the instructions and data that the processor needs at runtime. In some implementations, the processes of the subject disclosure are stored in system memory 1004, permanent storage device 1002, and/or ROM 1010. From these various memory units, processing unit(s) 1012 retrieves instructions to execute and data to process in order to execute the processes of some implementations.

Bus 1008 also connects to input and output device interfaces 1014 and 1006. Input device interface 1014 enables the user to communicate information and select commands to the electronic system. Input devices used with input device interface 1014 include, for example, alphanumeric keyboards and pointing devices (also called "cursor control devices"). Output device interface 1006 enables, for example, the display of images generated by electronic system 1000. Output devices used with output device interface 1006 include, for example, printers and display devices, such as cathode ray tubes (CRT) or liquid crystal displays (LCD). Some implementations include devices such as a touchscreen that functions as both input and output devices.

Finally, as shown in FIG. 10, bus 1008 also couples electronic system 1000 to a network (not shown) through a network interface 1016. In this manner, the computer can be a part of a network of computers (such as a local area network ("LAN"), a wide area network ("WAN"), or an Intranet, or a network of networks, such as the Internet. Any or all components of electronic system 1000 can be used in conjunction with the subject disclosure.

These functions described above can be implemented in digital electronic circuitry; or in computer software, firmware or hardware. The techniques can be implemented using one or more computer program products. Programmable processors and computers can be included in or packaged as mobile devices. The processes and logic flows can be performed by one or more programmable processors or by one or more programmable logic circuitry. General and special purpose computing devices and storage devices can be interconnected through communication networks.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for establishing a secure network comprising a plurality of host computers, the method comprising:
   receiving, by a respective host computer from a server computer, at least one symmetric encryption key, which facilitates secure communications among the plurality of host computers;
   wherein each host computer comprises at least a smart network interface card;
   wherein a central processing unit (CPU) of each host computer supports remote attestation; and
   wherein receiving the symmetric encryption key from the server computer comprises:
      establishing a trusted channel between a protected region within the CPU of the respective host computer and the server computer via a remote attestation operation;
      receiving, at the CPU of the respective host computer, the symmetric encryption key from the server computer over the trusted channel; and
      forwarding the symmetric encryption key to the smart network interface card of the respective host computer over a secure channel established between the protected region within the CPU and the smart network interface card.

2. The computer-implemented method of claim 1, wherein the smart network interface card of the respective host computer is configured to encrypt a packet to be sent to a second host computer using the symmetric encryption key before transmitting the packet to the second host computer.

3. The computer-implemented method of claim 2, wherein a corresponding smart network interface card of the second host computer is configured to decrypt the encrypted packet.

4. The computer-implemented method of claim 1, wherein the CPU of each host computer implements at least in part an embedded trusted execution environment (TEE) technology, and wherein the TEE technology includes at least one of: Intel® Software Guard Extension (SGX) technology, Arm® TrustZone technology, and AMD® Secure Technology.

5. The computer-implemented method of claim 1, wherein the respective host computer is configured to receive a set of symmetric encryption keys, wherein each individual symmetric encryption key is used for secure communications between the respective host computer and a different host computer selected from the plurality of host computers.

6. The computer-implemented method of claim 5, further comprising receiving, from the server computer, a key-host mapping table that maps the received symmetric encryption keys to other host computers within the plurality of host computers.

7. The computer-implemented method of claim 1, wherein the smart network interface card comprises a processor embedded with a trusted firmware module, and wherein the trusted firmware module facilitates establishing the secure communication channel between the protected region within the CPU and the smart network interface card.

8. The computer-implemented method of claim 7, wherein establishing the secure communication channel between the protected region within the CPU and the smart network interface card involves a public/private key pair associated with the trusted firmware module.

9. The computer-implemented method of claim 1, wherein the plurality of host computers forms a network group, wherein the plurality of host computers comprises a gateway host computer, and wherein the method further comprises:
receiving, by the gateway host computer from a global server computer, at least one inter-group encryption key, which facilitates secure communications among the plurality of network groups.

10. The computer-implemented method of claim 9, a smart network interface card associated with the gateway host computer comprises an inter-group port for transmitting and receiving inter-group packets, and wherein the global server computer is configured to send the inter-group encryption key to the smart network interface card associated with the gateway host computer.

11. A secure network, comprising:
a server computer; and
a plurality of host computers;
wherein the server computer is configured to distribute at least one symmetric encryption key among the plurality of host computers to enable the plurality of host computers to communicate securely with each other using the distributed symmetric encryption key;
wherein each host computer comprises at least a smart network interface card;
wherein a central processing unit (CPU) of each host computer supports remote attestation; and
wherein while distributing the symmetric encryption key among the plurality of host computers, the server computer is configured to:
perform a remote attestation operation to establish a trusted channel between the server computer and a protected region within the CPU of a respective host computer; and
transmit, over the trusted channel, the symmetric encryption key to the CPU of the respective host computer, which in turn forwards the symmetric encryption key to the smart network interface card of the respective host computer over a secure channel established between the protected region within the CPU and the smart network interface card.

12. The secure network of claim 11, wherein the smart network interface card of the respective host computer is configured to encrypt a packet to be sent to a second host computer using the symmetric encryption key before transmitting the packet to the second host computer.

13. The secure network of claim 12, wherein a corresponding smart network interface card of the second host computer is configured to decrypt the encrypted packet.

14. The secure network of claim 11, wherein the CPU of each host computer implements at least in part an embedded trusted execution environment (TEE) technology, and wherein the TEE technology includes at least one of: Intel® Software Guard Extension (SGX) technology, Arm® TrustZone technology, and AMD® Secure Technology.

15. The secure network of claim 11, wherein the server computer is configured to distribute a set of symmetric encryption keys, wherein each individual symmetric encryption key is used for secure communications between a particular pair of host computers selected from the plurality of host computers.

16. The secure network of claim 15, wherein the server computer is further configured to distribute, among the plurality of host computers, a key-host mapping table.

17. The secure network of claim 11, wherein the smart network interface card comprises a processor embedded with a trusted firmware module, and wherein the trusted firmware module facilitates establishing the secure communication channel between the protected region within the CPU and the smart network interface card.

18. The secure network of claim 11, wherein establishing the secure communication channel between the protected region within the CPU and the smart network interface card involves a public/private key pair associated with the trusted firmware module.

19. The secure network of claim 11, wherein the plurality of host computers forms a network group, wherein the secure network further comprises a global server computer and a plurality of network groups, and wherein the global server computer is configured to distribute at least one inter-group encryption key among a plurality of network groups to enable the plurality of network groups to communicate securely with each other using the inter-group encryption key.

20. The secure network of claim 19, wherein a respective network group comprises a gateway host computer, wherein a smart network interface card associated with the gateway host computer comprises an inter-group port for transmitting and receiving inter-group packets, and wherein the global server computer is configured to send the inter-group encryption key to the smart network interface card associated with the gateway host computer.

\* \* \* \* \*